Dec. 20, 1966 L. MOORE 3,293,605

DIGITAL MONITORING SYSTEM

Original Filed Sept. 14, 1961 5 Sheets-Sheet 1

INVENTOR.
LAURENCE MOORE

BY Edward B. [signature]

ATTORNEY

INVENTOR.
LAURENCE MOORE

BY

ATTORNEY

Dec. 20, 1966 L. MOORE 3,293,605

DIGITAL MONITORING SYSTEM

Original Filed Sept. 14, 1961 5 Sheets-Sheet 3

INVENTOR.
LAURENCE MOORE

BY Edward B. Gregg

ATTORNEY

DIGITAL MONITORING SYSTEM

Original Filed Sept. 14, 1961 5 Sheets-Sheet 4

INVENTOR.
LAURENCE MOORE
BY [signature]
ATTORNEY

INVENTOR.
LAURENCE MOORE
BY
ATTORNEY

United States Patent Office 3,293,605
Patented Dec. 20, 1966

3,293,605
DIGITAL MONITORING SYSTEM
Laurence Moore, 1280 Lincoln Ave., Palo Alto, Calif. 94301
Continuation of application Ser. No. 138,114, Sept. 14, 1961. This application Jan. 20, 1966, Ser. No. 532,491
12 Claims. (Cl. 340—150)

This application is a continuation-in-whole of application Serial No. 138,114, filed September 14, 1961, and now abandoned.

This invention relates to monitoring or telemetering systems also known as supervisory systems and more particularly to systems for continuously and rapidly monitoring a series of functions at a plurality of different stations in which each function can be represented in binary form to provide an indication of the condition of the function at a distant location.

The present application is a continuation-in-part of my copending application, Serial No. 862,955, filed December 30, 1959, entitled "Digital Telemetering System," now Patent No. 3,088,098. The digital telemetering system disclosed in the above referred to copending application comprised a single coding station which samples a series of functions to be monitored or controlled and emits a coded pulse train whose pulses represent the condition of the functions under control. This pulse train is transmitted over a suitable communication link such as telephone lines or VHF or microwave radio to a decoder. The decoder decodes the coded pulse train and supplies the decoded information to a suitable utilization or alarm system which provides an indication of the condition of each of the monitored functions.

One of the limitations of such a system is that the functions which may be monitored are limited as to number by the size and complexity of the coding and decoding equipment, and as to location by their proximity to the coder. Also, the decoding unit is not utilized to its full capabilities since its useful function is the detection of an abnormal condition of the functions it monitors and abnormal conditions do not occur constantly. Consequently it is desirable to utilize a decoding unit to monitor a large number of stations and thereby make its mode of operation more efficient.

It is therefore an object of this invention to provide a monitoring system to monitor the condition of a plurality of functions at diverse physical locations.

It is a further object of this invention to provide a plurality of coded pulse trains for decoding at a single receiving station in which each pulse train provides an indication of a series of functions.

It is another object of this invention to provide a system for monitoring a plurality of stations, each including a series of functions, to obtain an indication of the abnormal operation of any function. Each station is to provide a coded pulse train utilizing the same coding scheme so that a single decoder may be utilized to decode the pulse trains.

It is still another object of this invention to provide a monitoring system capable of handling the supervision of a large number of functions and which is reliable and economical in operation.

In accordance with the present invention, there are provided a plurality of independently operated coding stations at different locations such as for example at the different branches of a post office or a bank or at different processing plants of a nationwide refinery. Each coding station samples a given number of functions such as temperature, burglar alarm, pressure, fluid flow, position, etc., by means of a function transducer located in its vicinity and emits a sequence of pulses in the form of a pulse train whose pulses represent the condition (in binary representation) of the functions it monitors. Each of the pulses within a coded pulse train represents one of the functions and a characteristic of each pulse is modified in response to a variation in the corresponding function just as before. In the preferred embodiment, the width or duration of each pulse is subject to modification in response to a predetermined change in the corresponding function, so that the width of each pulse in the resulting pulse train is a measure of the status of the corresponding function.

Associated with each of the plurality of coders is a communication link such as a transmitter and receiver. The coded pulse train from each receiver is applied to an associated alarm detector which provides an indication when a function operates abnormally or when there is a failure of the communication link. The coded pulse trains from each receiver are also applied to a switch whose pole selector terminal is the input terminal of a single decoder unit. When one of the alarm detectors indicates a malfunction at a particular station, the pulse train from that station is then switched into the decoder so that the particular function or functions giving rise to the actuation of the alarm detector may be determined through decoding.

In other words, each station has associated therewith an alarm detector at the receiving end which indicates the presence of some malfunction at that station. Only after such station malfunction has been noted need the received coded pulse train be applied to the single decoder which is shared between all stations. The alarm detectors are also provided with means which indicate a new malfunction and with means which indicates the presence of a continuing malfunction. Also means are provided to automatically extinguish the indication of a continuing malfunction as soon as the station resumes normal operation.

Other objects and advantages and a fuller understanding of this invention may be had by reference to the following specifications and the drawings in which.

Figure 1:
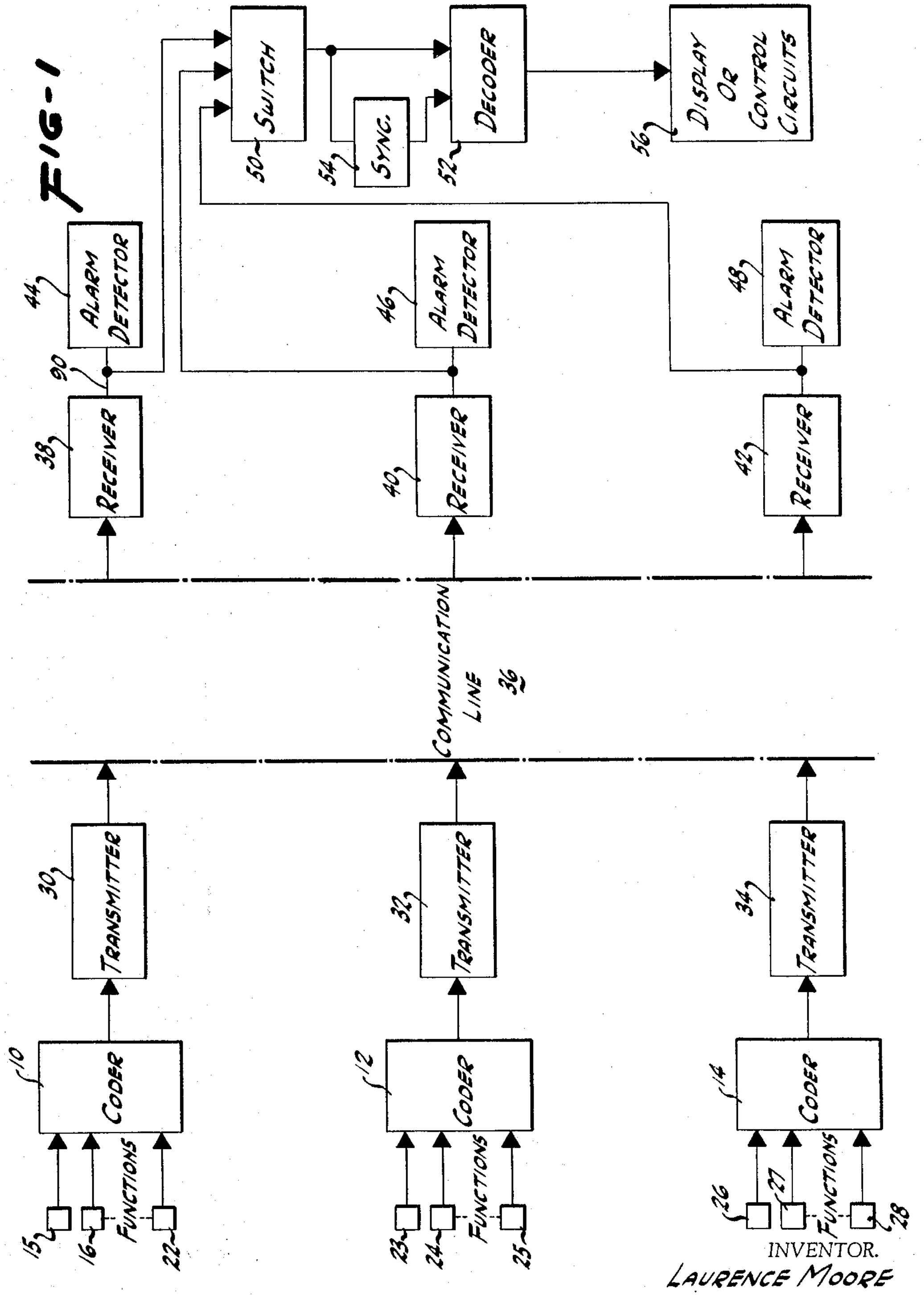
FIG. 1 is a schematic block diagram of the elements of the complete system of the present invention.

Referring now to the drawings, and particularly to FIG. 1 thereof, there is shown a plurality of station coders 10, 12 and 14, each having associated therewith a number of functions to monitor and each emitting a coded pulse train which provides an indication of the condition of the associated functions. The number of functions which may be associated with a particular station coder is arbitrary and may be made quite large. Since, as will be explained hereinafter, a time division multiplex system of communication is employed in the preferred embodiment of this invention, one limit in the number of functions that may be coded by one station coder is the repetition rate of the particular function. The larger the number of functions, the greater the time interval between successive monitoring of the same function if the time interval allotted to each function remains the same. A further consideration of the number of functions which may be associated with one coder is economy. Binary coding matrixes can handle the coding of $2^n$ functions where $n$ is an integer so that greatest economy is provided by associating 2, 4, 8, 16, 32, etc., functions with a given station coder. Any other number would result in operation below full capacity.

In FIG. 1, station coder 10 is shown as having associated therewith functions designated by reference characters 15, 16 and 22; station coder 12 having associated therewith functions 23, 24 and 25; and station coder 14 having associated therewith functions 26, 27 and 28. In practice the number of functions associated with each station coder, as already explained, is larger as indicated by the dotted lines between functions, and the number selected for the purpose of describing and explaining the present invention is eight. Also the number of coding stations associated with the monitoring system of this invention is quite arbitrary and may be selected on the basis of how many abnormal operations of functions are expected in a given time interval based upon past experience, and can be conveniently handled by a single operator or a single display unit.

The coded pulse trains from each station coder are applied to an associated transmitter, such as transmitters 30, 32 and 34, for transmission over a suitable communication link 36. Communication link 36 may comprise telephone lines, carrier equipment plus telephone lines or VHF or microwave radio. The transmitted pulse trains are received by receivers, such as receivers 38, 40 and 42, each tuned or connected to an associated transmitter in a manner well known to those skilled in the art. The received pulse trains are applied to associated alarm detectors, such as detectors 44, 46 and 48, and to a common selector switch 50.

In a preferred embodiment of this invention, the communication link comprises a radio-telegraph system utilizing frequency shift keying because of the inherent discrimination against noise and fluctuations of amplitude. Accordingly, transmitters 30, 32 and 34 each generate a different center modulating frequency selected from a band of frequencies such as for examrle 400 to 15,000 cycles per second, to indicate one condition of the pulse train (usually the condition that no pulse is present). The presence of a pulse is indicated by a frequency shift of about 30 to 50 cycles per second from the center modulating frequency. The receiver has a band width of about 200 cycles per second centered at the center modulating frequency of its associated transmitter to discriminate against pulse trains from other transmitters and detects the frequency change in the customary manner by the use of discriminators.

An alarm detector such as detector 44 provides a resettable indication of the start of some abnormal condition of its associated station by sounding an audible alarm, or by flashing a lamp or both, but gives no indication as to which function behaves abnormally. At the same time, alarm detector 44 initiates a resettable indication of malfunction which remains set until the abnormal condition has ceased. The resettable indication at the start of an abnormal condition is manually reset as soon as possible so that the occurrence of a new malfunction can trip the alarm mechanism once more.

After an alarm is received, selector switch 50 is set to the station whose alarm indicator shows the presence of an abnormal condition so that its associated pulse train may be applied to the decoder 52 synchronized by means of synchonizer 54 to the zero or starting pulse of the train. Decoder 52 decodes the selected coded pulse train and provides an indication of the particular function of the monitored station which is operating abnormally. Display circuit 56 provides a visual (or other) identification of the particular function which operates abnormally and the station indicator which may be incorporated or duplicated in display circuit 56 provides the identification of the particular station at which the abnormally operating function is located (or coded).

Figure 2:
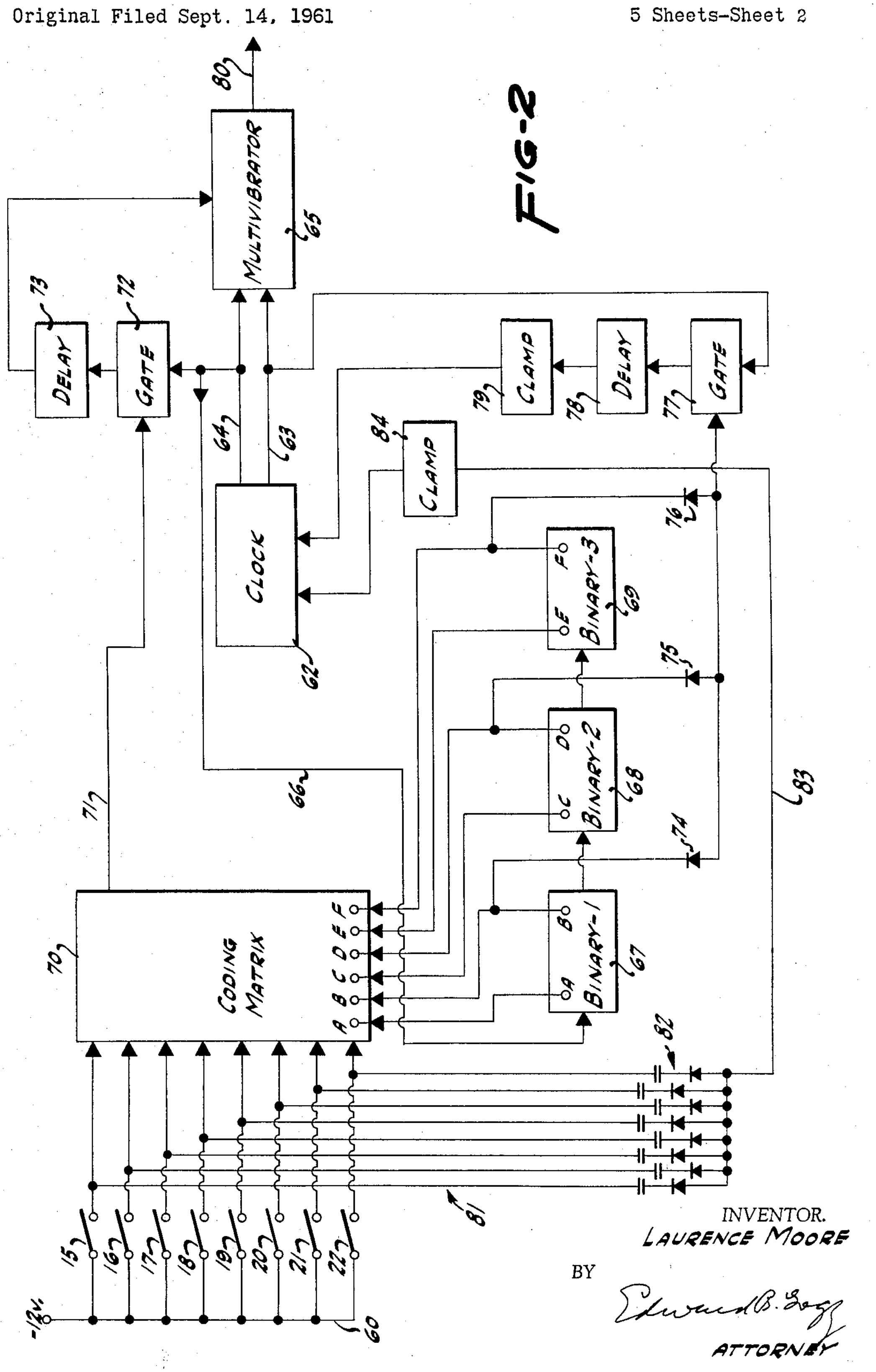
FIG. 2 is a schematic block diagram of the equipment forming the coding portion of one station of this invention.

Referring now to the preferred embodiment of the coder portion of the present invention of a single station shown in FIG. 2, a plurality of functions represented by switches 15, 16, 17, 18, 19, 20, 21 and 22 are associated with a coding matrix 70. Switches 15–22 represent schematically any functions which are to be monitored or controlled by the monitoring system of the present invention and which can be mechanized by suitable transducers to provide an output signal in binary form. A source of negative potential, represented by conductor 60, may be connected in common to one terminal of each of switches 15–22. For the purposes of the present embodiment, let it be assumed that the functions correspond to a condition which is considered abnormal when the switch is closed.

To continuously monitor the condition of the switches (i.e., whether open or closed) there is provided a clock in the form of a free running unsymmetrical multivibrator 62 which has a pair of output terminals represented by conductors 63 and 64.

Clock 62 provides the basic timing for the monitoring system and also provides the pulse train which is coded to carry the binary information. The cycle of clock 62 is divided into eight periods corresponding to the eight functions to be monitored. The output waveforms from output conductors 63, 64 are shown by the graphs of *5a* and *5b*. The output signal from terminal 63 has a negative portion which occupies two-thirds of a period and then has a positive portion occupying the remaining one-third of the period, while the output signal from terminal 64 is the complement of that from terminal 63, so that it begins with a positive portion occupying two-thirds of the cycle and ends with a negative portion for the remaining one-third. In the timing diagram of FIG. 5, the period referred to is the period in which one of the functions is sampled. Thus, as shown across the top of the timing diagrams of FIG. 5, for the eight function system which is assumed here, there are eight such periods during a cycle of clock 62, plus a "zero" or synchronizing period at the end of the cycle.

The output pulses from terminals 63 and 64 are applied to the input terminals of a multivibrator 65 which is preferably a bistable multivibrator which follows the clock 62. The output pulse train of multivibrator 65 comprises the pulse train from coder 10 (FIG. 1) which is transmitted via transmitter 30 over communication link 36 to receiver 38.

The positive going output signal from output terminal 64 of clock 62 is also applied, through a conductor 66, to the input terminal of a group of devices 67, 68 and 69 labeled "Binary —1," "Binary —2" and "Binary —3," respectively. Devices 67, 68 and 69 may be of any suitable type, such as bistable multivibrators, which divide the initial pulses from clock 62 by two, four and eight, respectively, as is well understood in the art. Each of devices 67, 68 and 69 has two output signals as illustrated in the timing diagrams *5c–5h*. The two output signals A, B from device 67 are the complements of each other and have a period equal to twice the period of clock 62 as shown in curves *5c* and *5d*. The output signals C, D from device 68 (FIGURES *5e*, *5f*) are also complementary to each other and have a period equal to 4 times the period of clock 62. The complementary output signals E, F from device 69 (FIGURES *5g*, *5h*) have a period equal to eight times the period of clock 62.

The six output pulses from the devices 67, 68 and 69 are applied to the correspondingly labeled input terminals of a coding matrix device 70 which is also connected to the function switches 15–22 and which serves to produce an output signal indicating the condition of the function switches. Matrix 70 may be of any suitable type capable of performing this operation, but it has been found that a matrix constructed and operating on the following principles is especially satisfactory.

Matrix 70 comprises a plurality of diodes and resistive impedances arranged in matrix form in rows and columns, with the connections thereto from switches 15–22 and from devices 67, 68 and 69 as shown in FIGURE 2. Matrix 70 operates so that when all the function switches are open or normal, no operative output signal is produced from the matrix, but when one or more of the function switches are closed or abnormal, matrix 70 produces an operative output signal whose position in time relative to the clock cycle indicates which of function switches 15–22 is closed. This action may be accomplished by utilizing the binary coding scheme set forth in the following table:

TABLE 1

| Switch | Binary Input | | | | | |
|---|---|---|---|---|---|---|
| | A | B | C | D | E | F |
| 15 | 1 | 0 | 1 | 0 | 1 | 0 |
| 16 | 0 | 1 | 1 | 0 | 1 | 0 |
| 17 | 1 | 0 | 0 | 1 | 1 | 0 |
| 18 | 0 | 1 | 0 | 1 | 1 | 0 |
| 19 | 1 | 0 | 1 | 0 | 0 | 1 |
| 20 | 0 | 1 | 1 | 0 | 0 | 1 |
| 21 | 1 | 0 | 0 | 1 | 0 | 1 |
| 22 | 0 | 1 | 0 | 1 | 0 | 1 |

In the above table, a binary 1 indicates a negative value, while a binary 0 indicates a less negative or positive value. A study of this table will show that for each of the eight function switches 15–22 there is a unique combination of three of the binary inputs A through F which are negative. For example, for switch 15, binary inputs A, C and E are negative; for switch 19, binary inputs A, C and F are negative; for switch 22, binary inputs B, D and E are negative. The above relationships between the polarities of the different binary inputs and the different clock periods can be seen in the timing diagrams of FIGURE 5 which show the unique combinations described in the table.

When there is both a negative signal applied through any one of function switches 15–22 and the unique combination of negative input signals on the binary input signals associated with that switch or switches, matrix 70 is operative to produce a negative output signal on its common output conductor 71. One method of producing the above described unique combinations of input signals is to utilize diodes which are selectively connected to the different function switches and to the different binary inputs. For example, in the row of the matrix corresponding to function switch 15, diodes can be provided in the columns corresponding to binary inputs A, C and E and these diodes can be so connected that they require the presence of negative voltages thereon to become conductive.

Thus, when binary input terminals A, C and E are negative, as they are only during the first period of the clock cycle, these diodes in the row representing switch 15 all have negative voltages thereacross and are conductive. If, at the same time, the function switch 15 is closed, the negative potential from terminal 10 is also applied through closed switch 15 to this row of matrix 70 to produce a negative output signal on conductor 71. It will be understood that other diodes will be similarly disposed and connected in the other columns of the rows of the other function switches in accordance with the code of the Table 1, and that a negative output will be produced from the matrix on conductor 71 when any function switch is closed and the binary input signals for that particular switch are all negative.

Output conductor 71 of matrix 70 is connected to the control input terminal of a gate 72. Gate 72 receives a controlled input signal from output terminal 64 of clock

62. The output signal from gate 72 is connected to a delay network 73 whose output signal in turn is connected to multivibrator 65. When gate 72 receives a positive input signal over conductor 71, gate 72 will not open to permit passage of the clock pulse from terminal 64 so that delay 73 is not actuated. However, when a negative pulse appears on conductor 71, gate 72 is opened to pass the clock pulse from terminal 64 to delay 73 to operate this delay.

Delay 73 has a delay period of one-third the time of one of the periods of the clock cycle, so that when delay 73 is actuated it causes multivibrator 65 to reverse its state in just one-half the time usually required when this multivibrator is reversed by the clock pulses from clock 62. This reversal of multivibrator 65 by delay 73 produces the distinctive modulation of the pulse train which is indicative of an abnormality of one of the function switches, as will presently be described.

There is also provided a gate network 77 which receives a control input from what is, in effect, a three-way negative AND gate in the form of diodes 74, 75 and 76. Diodes 74 is connected to terminal B of device 67; diode 75 is connected to terminal D of device 68; and diode 76 is connected to terminal F of device 69. When terminals B, D and F are all negative, as they are only during the eighth period of the clock cycle, a negative pulse is passed simultaneously through diodes 74, 75 and 76 to open gate 77 and to permit the positive going portion of the controlled pulse from terminal 63 of clock 62 to pass there through to a delay network 78.

The output signal from delay 78 is applied to a clamping network 79 which is, in turn, connected to an input terminal of clock 62. Actuation of clamp 79 by delay 78 clamps clock 62 to cause the positive output signal from the terminal 63 (and the complementary output signal from terminal 64) to remain positive (and negative for the complementary cycle) for a period which is longer than two-thirds of one of the clock periods. This action causes a longer period to exist between the start of the eighth pulse and the start of the following first pulse than exists between any other adjacent pairs of pulses, and it is this longer interval which is utilized to indicate the end of the pulse train for one cycle for synchronizing the coding portion with the alarm and the decoding portion of the system.

Also connected to switches 15–22 are a set of individual leads generally designated by reference character 81, each of which includes a series combination of a capacitor and a unidirection current conducting means such as a diode as generally shown at 82. A common conductor 83 ties the individual diodes together so that if any of the switches 15–22 are closed, a negative pulse from conductor 60 is transmitted by 82 and applied to conductor 83. The purpose of including diodes into lead 81 is to provide isolation between the various switches so that closure of one switch does not cause a negative signal to appear on the leads connecting the other switches to matrix 70 and thereby give an erroneous indication of abnormal operation. Conductor 83 is connected to the input terminal of a clamp network 84.

Actuation of clamp 84 by a negative pulse (closing f one or more of the switches) clamps clock 62 to cause the positive output thereof to remain positive for a predetermined interval. It has been found that a period of about a fifth of a second is sufficiently long as will be more fully explained in connection with the operation of alarm detectors 44, 46 and 48. In effect, the clamp 84 upon receiving a negative pulse stops the clock for a considerable amount of time so that no pulse train is generated and lead 80 remains at its no-pulse output voltage. At the end of the clamping interval caused by clamp 84, clock 62 again becomes operative and a pulse train is generated which includes a coded indication of which switch caused the disruption of clock 62.

Figure 5:
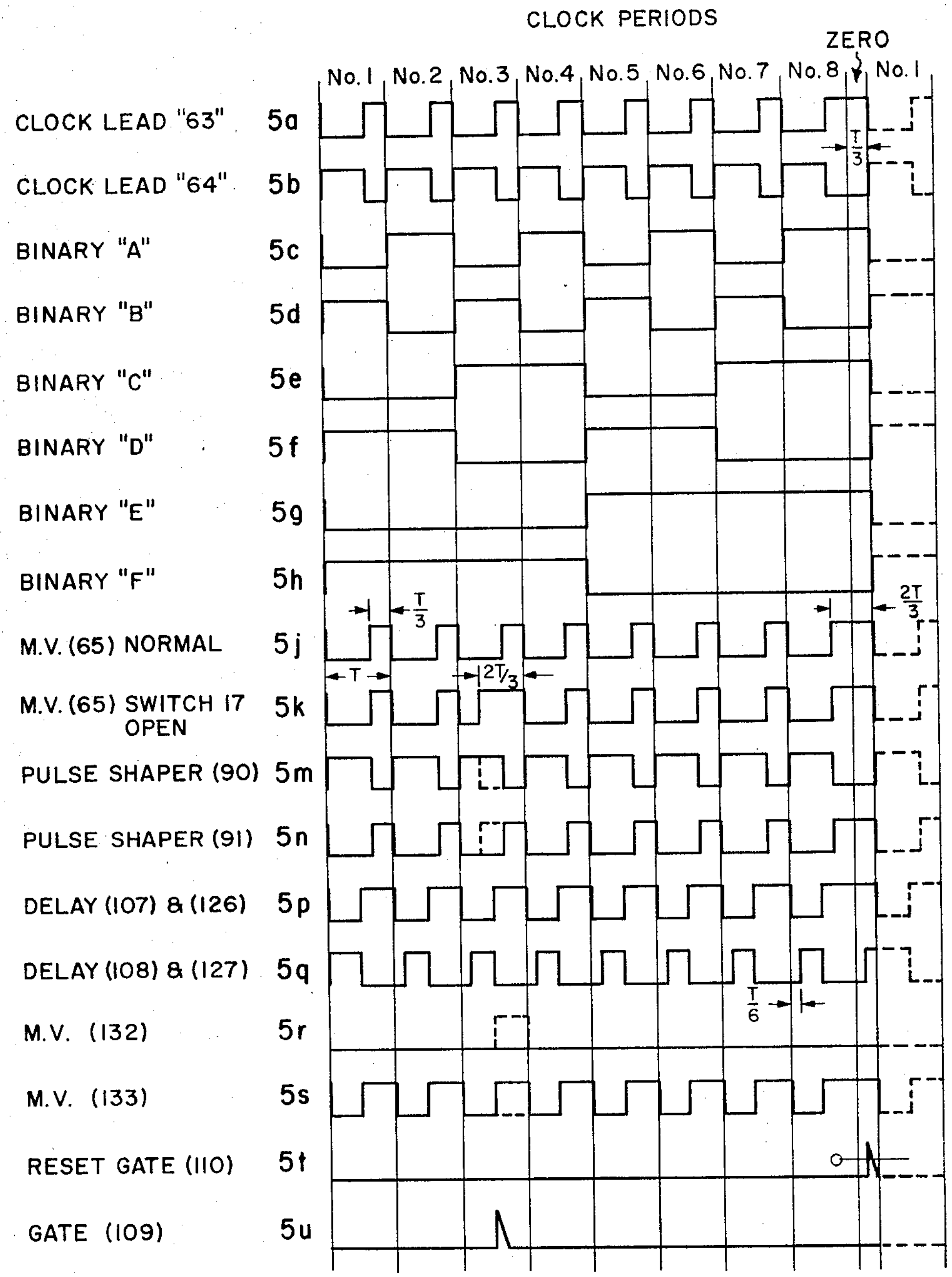
FIG. 5 is a series of timing diagrams illustrating the wave forms of the electrical signals at different points in the circuits of FIGS. 2, 3 and 4.

The operation of the coding of the system can best be understood by reference to the timing diagrams of FIG. 5. First, assume that all the functions are normal or switches are open. Clock 62 is operating and drives multivibrator 65 to produce an output pulse train which is shown in FIG. 5*j*. In this pulse train, each pulse is negative for approximately two-thirds of a period, and then goes positive for the remaining one-third of the period. With all of the function switches open, none of the rows of coding matrix 70 receive a negative input from conductor 60 through the function switches, so that matrix 70 does not produce a negative output on conductor 71. Under these conditions delay 73 is not actuated and does not affect the operation of multivibrator 65. The output pulse train from multivibrator 65 thus consists of identical long pulses for each function position.

At approximately two-thirds of the way through the eighth pulse period, when the output pulse on terminal 63 goes positive, gate 77 is actuated to pass this positive pulse to delay 78 and thus operate a clamp 79, as described above. Gate 77 is opened by the existence of three negative pulses on binary output terminals B, D and F during the eighth period, as already mentioned. When clamp 79 is operated, it clamps the positive output of clock 62 so as to keep this output positive for a period which is approximately two-thirds of one of the clock periods. This distinctively long positive pulse at the end of the pulse train serves to identify the end of the train for purposes of synchronization.

Next, assume that function switch 17 is closed, indicating an abnormality of the function represented by that switch. Upon closing switch 17, a negative voltage is applied to the lead of group 81 connected to that switch and the capacitor 82 provides an output pulse of negative polarity which is applied through lead 83 to clamp 84. When clamp 84 is operated, it clamps the positive output signal of clock so as to keep this output signal positive (and the negative output signal negative) for a time sufficiently long to change the output signal of an integrator to which this pulse train is applied and thereby to trip the alarm detector as will presently be explained. This relatively long positive pulse (in relation to the length of a clock period) serves to identify the commencement of some abnormal operations and is used to set off the alarm detector.

At the end of the clamping pulse from clamp 84, clock 62 again commences its normal operation to drive multivibrator 65 and to generate the pulse train. However, when the third pulse in the clock train is generated, a negative polarity will exist on output terminals A, D and E of binary devices 67, 68 and 69, as indicated by Table 1 and by the graphs 5*c* to 5*h*. With switch 17 closed, a negative potential is applied from conductor 60 to the row of matrix 70 corresponding to switch 17. Since the diodes in the A, D, and E columns of this row of the matrix are at this time receiving negative pulses from their associated binary terminals A, D and E, this row of the matrix becomes conductive to produce a negative output pulse on conductor 71. This negative pulse is applied to gate 72, and since gate 72 is at this time receiving a positive controlled pulse from terminal 64 (the third clock pulse of the train), gate 72 is opened to operate the delay 73.

Delay 73, whose output signal is applied to multivibrator 65, has a delay period equal to approximately one-third of a clock period and thus causes multivibrator 65 to reverse its state of conductivity in one-half the time that would have been required if it were reversed by the next pulse in the clock train. This produces a pulse during the third clock period which is shorter than the other pulses, as indicated clearly in FIGURE 5*k*, and it is this distinctively modulated pulse which is sensed in the decoding system to provide an indication of the existence and location of the abnormal condition.

Figure 3:
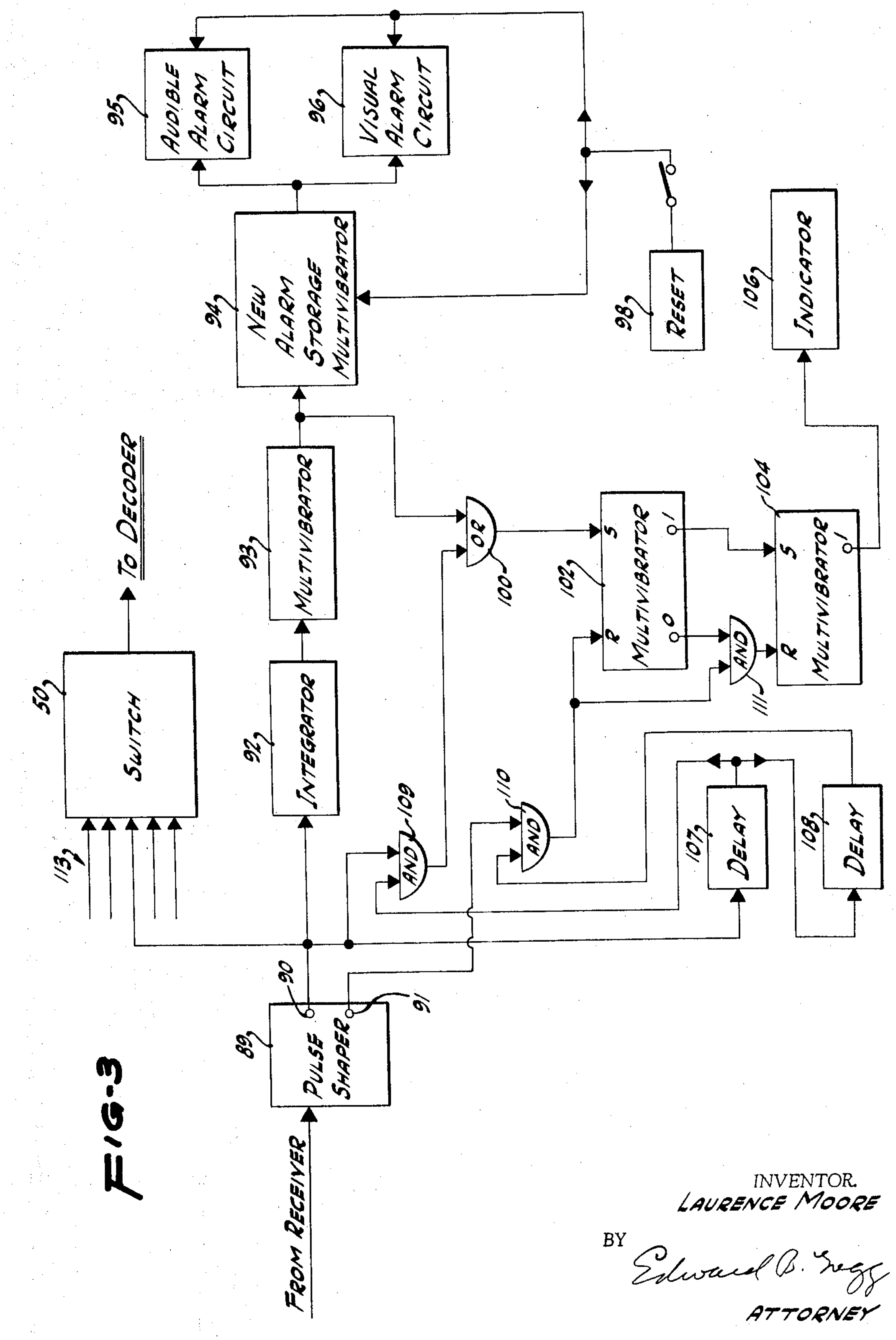
FIG. 3 is a schematic block diagram of the equipment forming the station alarm portion of one station of this invention.

After transmission over the particular communication link 36 selected, the individual coded pulse trains from transmitters 30, 32 and 34 are respectively received by receivers 38 40 and 42 and applied to their associated alarm detectors 44, 46 and 48 and to the selector pole of switch 50. FIG. 3 is a schematic block diagram of an alarm detector, say detector 44 having the received pulse train applied thereto through a pulse shaper 89. As a practical matter, pulse shaper 89 may be located in the output stage of receiver 38 and is provided to sharpen the edges of the pulses and to equalize their amplitudes to compensate for any distortion the pulse train may have undergone during transmission.

Pulse shaper 89 is preferably a bistable multivibrator which produces a positive going output signal at terminal 90 as shown in graph 5*m* and produces a negative going output signal at terminal 91 (its complement) as shown in graph 5*n*. The pulse train from terminal 90 is applied to the pole selector terminal of selector switch 50 for selective transmission to decoder 52 which decodes the pulse train as will be explained in connection with the description of FIG. 4.

The pulse train from terminal 90 is also applied to an integrator 92 which provides an output voltage as long as a pulse train is received. The output voltage of integrator 92 will fall to zero (or some other selected value) when the pulse train is interrupted, a condition encountered when clamp 84 (FIG. 2) shuts off clock 62 due to the closing of one of switches 15 to 22 or when there is some other type of malfunctioning such as a failure of the communication link. As soon as the integrator voltage drops, a multi-stable multivibrator 93 connected thereto is triggered to provide an output voltage to trigger a bistable multivibrator 94. Multivibrator 94 is a new alarm storage device which is set each time a new malfunction occurs at its associated station. The occurrence of a new alarm (the setting of multivibrator 94) may be indicated by connecting either an audible new alarm circuit 95 or a visual new alarm circuit 96 or both to multivibrator 94 so an operator may be apprised of some new malfunction.

The function of multivibrator 93 is to trigger multivibrator 94 when the output voltage from integrator 92 drops and to provide a pulse for triggering multivibrator 102. Of course, the integrator output voltage may itself be utilized to trigger new alarm multivibrator 94, and the set pulse which activates the alarm circuits 95 and 96 may also be connected to OR circuit 100 to trigger multivibrator 102. Alternately, the set pulse may be directly applied to multivibrator 104.

A manual reset circuit 98 is provided to reset multivibrator 94 and to shut off audible and visual alarm circuits 95 and 96 so that the new alarm circuits become again operative to indicate a new abnormal condition at its associated station.

The trigger pulse from multivibrator 93 is also applied to the SET terminal of a bistable multivibrator 102 through an OR circuit 100. Bistable multivibrator 102 in turn triggers a second bistable multivibrator 104 which has its high output line connected to a station status indicator 106. Station status indicator 106 provides an indication of station malfunction until all functions at this particular station are once more operating normally. As a matter of convenience, station status indicator 106 may be physically placed in close proximity to station selector switch 50 since it is this indicator which is usually observed by the operator to select the particular station for decoding to determine which function is behaving abnormally.

The positive going output pulse from pulse shaper 89 also drives a delay network 107 which provides a pulse having a duration of one-half of a period of the clock cycle. The wave form of the output signal from delay 107 is illustrated in FIG. 5*p* and, upon being triggered, swings negative for one-half a period and then returns to its positive value for the other half of the period. The output signal from delay 107 drives a second delay network 108 which is triggered by the positive going edge of the negative pulse from delay network 107. When triggered, delay network 108 provides a negative going pulse, as shown in FIG. *5q* which has a duration equal to two-thirds of the period of the clock cycle. The developed pulse from first delay network 107 is applied to a set gate 109 (of the AND circuit type) to initiate a set operation if set gate 109 is open when the negative pulse from delay 107 arrives. This set pulse is applied through a conventional OR gate 100 to bistable multivibrator 102.

The delayed pulse from second delay network 108 is applied to a first reset gate 110 (of the AND circuit type) to initiate the first stage of the reset operation if reset gate 110 is open when the positive pulse from delay 108 arrives. This set pulse is applied to the reset terminal of bistable multivibrator 102 and to a second reset gate 111 (of the AND circuit type) to initiate the second stage of the reset operation if reset gate 111 is open when the positive pulse from delay 108 arrives. The "high" output terminal of bistable multivibrator 102 is also connected to the SET terminal of second bistable multivibrator 104 so that a set pulse applied to multivibrator 102 will set both multivibrators 102 and 104 at the same time. The "high" output terminal of second multivibrator 104 is directly coupled to station status indicator 106. Station indicator 106 remains "on" as long as one of its associated functions is abnormal or when transmission is interrupted.

The pulse form reset gate 111 is applied to the reset terminal of second multivibrator 104. Also gate 111 is opened and closed by the output of the "low" terminal of multivibrator 102 so that multivibrator 104 is only reset when a reset pulse is received and multivibrator 102 is in its reset condition. In effect this implies that it requires two consecutive reset pulses to turn station indicator 106 to its "off" position.

The operation of the alarm detector can best be explained by first assuming that all function switches of its associated station are open. Under these conditions, the pulse train received at pulse shaper 89 is uniform and pulse shaper produces two output pulse trains at terminals 90 and 91 as shown in FIGS. *5m* and *5n*. The positive going output pulse train from terminal 90 is applied to selector switch 50 for decoding, to integrator 92 for indicating a new alarm and to delay network 107 and gate 109 for setting indicator 106. The negative going output pulse train from terminal 91 is applied to reset gate 110 for resetting indicator 106.

The positive going output pulse train applied to integrator 92 provides a substantially constant output signal thereby leaving the operating condition of multivibrator 93 unchanged so that no output signal is provided by multivibrator 93 to trigger new alarm storage multivibrator 94 or to "set" multivibrator 102. Simultaneously, the positive going output pulse train triggers delay network 107 to produce an output pulse train as shown in graph *5p*, which in turn triggers delay network 108 to produce an output pulse train as shown in graph *5q*.

The positive going output pulse train from terminal 90 opens set gate 109 during the last one-third of the clock period and through the zero clock period when its output voltage is negative. The output pulse train from delay network 107 is negative only during the first one-half of the clock period. Set gate 109 is constructed to provide an output when both its inputs are negative so that during proper operation of the various functions, gate 109 is never open when the pulse train from delay 107 is negative. Consequently, there will be no output pulse from gate 109 and multivibrators 102 and 104 and therefore station status indicator 106 will remain "off."

The negative going output pulse train from terminal 91 opens reset gate 110 only during the last one-third of the clock period and during the zero clock period when the output voltage is positive. The output pulse train from delay 108 is positive during a portion of the first half of the clock period as shown in graph *5q*. In fact, since delay 108 is triggered by the positive going pulse from delay 107 which was triggered one-half of a clock period earlier and since delay 108 provides a negative going pulse of two-thirds of a clock pulse duration the total delay of the positive portion of the output pulse from delay network 108 is seven-sixths of a clock period delayed from the original initiating pulse of the positive going pulse train. Consequently, the output pulse of delay network 108 reaches its positive value one-sixth of a clock pulse period after the start of the period (neglecting the loss of a full period) which has a duration of two-sixths of a clock pulse. Since the pulses from terminal 91 and delay 108 are only simultaneously positive during the zero clock period, gate 110 only provides an output pulse during the zero clock period which is the reset pulse as shown in graph *5t*. This output or reset pulse resets multivibrator 102.

The reset pulse from gate 110 is also applied to gate 111 which is opened by the output signal from the "low" terminal of multivibrator 102 when the latter is in the reset state. Consequently, if indicator 106 was "on," the first zero period received by the alarm detector causes multivibrator 102 to be switched to its reset state and thereby to open gate 111. Upon reception of the second zero period by the alarm detector the reset pulse from gate 110 passes through open gate 111 to reset multivibrator 104 and to turn station status indicator off.

Assuming now that one of the functions is abnormal, say switch 17, FIG. 2, is closed. Closing of switch 17 causes a momentary interruption of the pulse train because clamp 84 stops operation of clock 62 for a predetermined period of time. This interruption of the pulse train causes the output voltage of integrator 92 to suddenly drop and thereby trigger circuit 93. The output of circuit 93 is a pulse which "sets" multivibrator 94 to activate alarm circuits 95 and 96 and multivibrator 102. As has been explained, setting of multivibrator 102 also sets multivibrator 104 and indicator 106.

After clock 62 commences operation and manual reset 98 reactivates new alarm multivibrator 94, the first zero period of incoming pulse train received by the station alarm detector will reset multivibrator 102 by providing a reset pulse from gate 110. Resetting of multivibrator 102 opens gate 111 and if switch 17 is open at that time, i.e., the malfunction has ceased, the next zero period will reset multivibrator 104 and extinguish indicator 106.

However, if switch 17 remains closed then prior to receiving the next zero period, gate 109 provides a further set pulse to again set multivibrator 102 since now, during the third period both the incoming pulse train (graph *5m*) and the pulse train from delay network 107 (graph *5p*) are simultaneously negative. This condition is shown by graph *5u*.

In other words, the negative pulse occurring during the first-half of the third period of the positive going pulse train from terminal 90 passes through open gate 109 to set multivibrator 102 once more. Consequently as long as switch 17 is closed, multivibrator 102 is alternately set by the pulse from gate 109 due to the malfunction and reset by the pulse from gate 110 due to the zero period so that multivibrator 104 remains set until no further pulses are received from gate 109. This condition will occur when all switches are open. Accordingly, indicator 106 remains on as long as there is any malfunction to indicate the station at which the malfunction is located.

It is also within the scope of this invention to recognize the zero period of the pulse train by interrogating at the center of the period with a pulse having a delay of two-thirds of a period and integrating the pulse train. In other words, the pulse train is integrated so that depending on the pulse width, a different output voltage is obtained. Since during the zero period there is a long flat pulse, the integrated zero period should provide an output which decays to a reference level. This output voltage is interrogated at the center of each period and only during the zero period is the integrated voltage low. This embodiment makes it possible to dispense with delay 108 thereby decreasing the number of components and the complexity of the station alarm unit.

Figure 4:
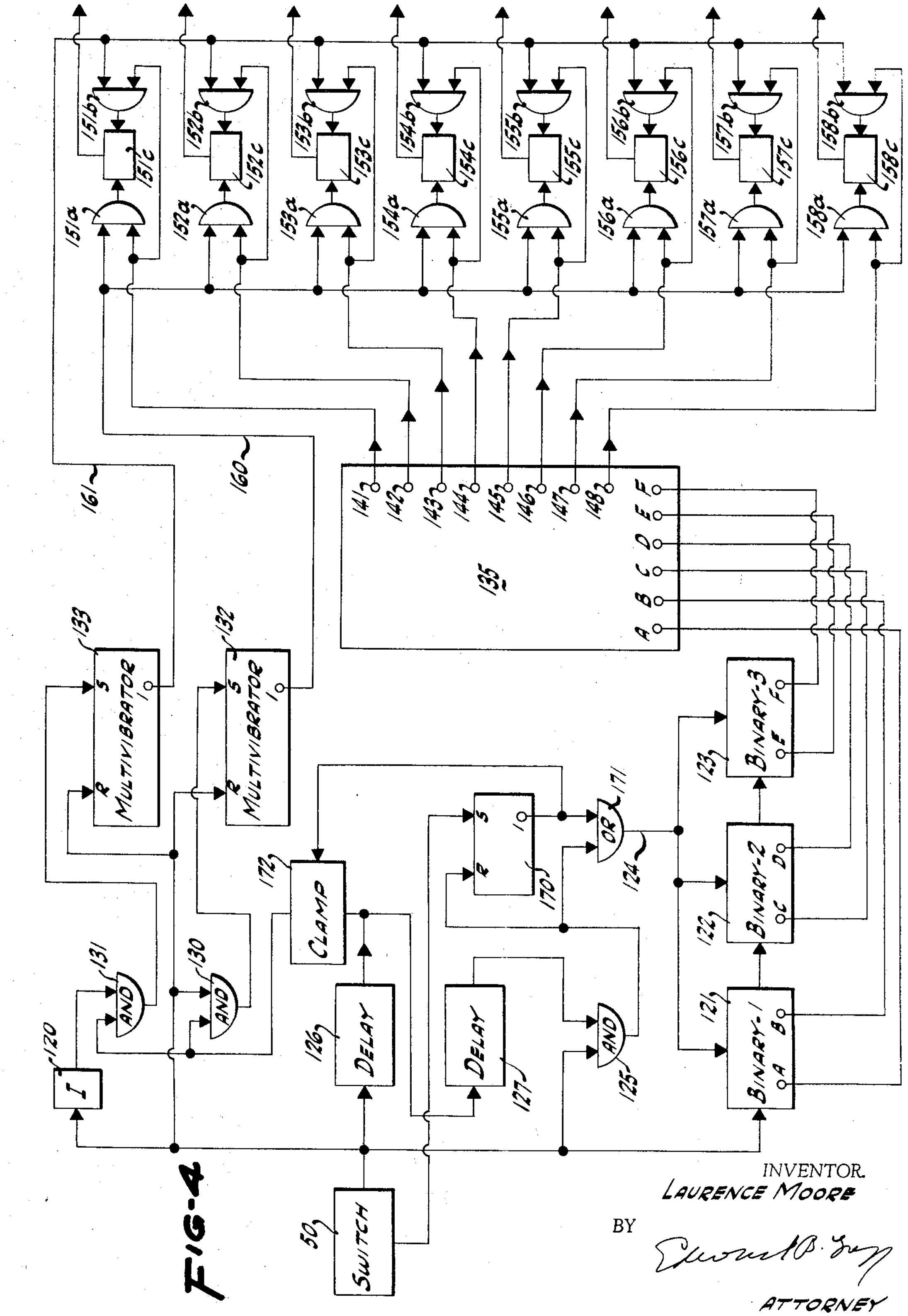
FIG. 4 is a schematic block diagram of the equipment forming the common decoding portion of the system.

After a malfunction at a particular station has been noted by an alarm detector and station indicator 106 is activated, the pulse train received from that station may be applied to the decoder shown in FIG. 4 through switch 50. In practice, both the positive going and the negative going pulse trains from pulse shaper 89 are applied to the decoder. For the purpose of this description it will be assumed that only the positive going pulse train shown in graph 5*m* will be applied to decoder 52 through switch 50 and that the complement of this pulse train is provided by an inverter 120 resulting in a pulse train as shown in graph 5*n*.

The positive going signal drives three binary devices 121, 122 and 123 which are substantially identical to devices 67, 68 and 69 of the coder and which operate to produce signals having the waveforms shown in FIGURES 5*c* through 5*h*. The output terminals of these devices are labeled A, B, C, D, E and F, in a manner similar to that used in connection with the description of the coder 10. Devices 121, 122 and 123 are supplied with a reset pulse through a conductor 124 from a reset gate 125 at the end of the eighth pulse in the pulse train, as will be described below.

The positive going output pulse from selector switch 50 also drives a delay network 126 which has a delay equal to one-half of a period in the clock cycle. The waveform of the output of this delay is the same as shown in graph 5*p*, and it begins with a negative portion for one-half a period and then swings positive for the other half of the period. The output signal from delay 126 drives a second delay network 127 which is triggered by the positive going edge of the negative pulse from delay 126. When triggered, delay 127 produces a negative going pulse, as shown in graph 5*q*, which has a duration equal to two-thirds of one of the periods of the clock cycle. This pulse from delay 127 is supplied to reset gate 125 to initiate a RESET operation if the RESET gate is open when the negative pulse from delay 127 arrives. It will be noted from graphs 5*p*, 5*q* that delay 127 is triggered by delay 126 and that the pulse from delay 127 extends through the first one-sixth of the following clock period, for a purpose which will be explained below. Delays 126 and 127 operate very much like delays 107 and 108 as will become more evident during a description of the operation of decoder 52.

The output pulse from the delay 126 is also applied in parallel to a pair of gates 130 and 131. Gates 130 and 131 are respectively connected to multivibrators 132 and 133. The pulse from delay 126 will trigger either gate 130 or gate 131 (and their associated multivibrators), depending upon which of these gates is open at the conclusion of the negative going portion of the pulse from delay 126. The opening of gates 130 and 131 is controlled by the pulses received from pulse shaper 89, gate 130 being connected to the positive going pulse train (switch 50) while gate 131 is connected to the negative going pulse train through inverter 120.

The output signals from the binary devices 121, 122 and 123, are supplied as separate inputs to a decoding matrix 135 which is somewhat similar to coding matrix 70. Matrix 135 has eight input terminals, 141, 142, 143, 144, 145, 146, 147 and 148 which are connected to the eight indicating or control means of the decoder to provide an indication or a control operation in response to detection of a closed switch in the coder section. Decoder matrix 135 receives the six signals A, B, C, D, E, and F from binary devices 121, 122, and 123 and is so constructed as to produce an output signal from one of its eight output terminals only when the unique combination of negative inputs appears in the columns of that row of the matrix. Matrix 135 operates on the same binary code as coder 70, as set forth in Table 1 and is operative to produce an output pulse in a given row corresponding to a given indicating circuit only when the input signals to the diodes in the three columns of that row are negative in accordance with the code of the table. Thus, an output signal appears on output conductor 141 during the first period of the clock cycle when binary inputs A, C and E are negative; an output appears on output terminal 143 during the third period of the clock cycle when the binary inputs A, D and E are negative, etc. Hence, an output signal is produced from decoding matrix 135 for each period of the clock cycle, and this output is supplied to the indicating or control circuit corresponding to that clock period or function.

The indicating or control circuits in the decoder may be of any suitable type, but preferably they are of the type illustrated in FIGURE 4. A separate circuit, 151, 152, 153, 154, 155, 156, 157 and 158 is provided for each function, and each such circuit may include, as shown for example for switch 151, an ON gate **151*a*, an OFF gate 151*b* and a driver network 151*c*. The output signals of gates 151*a*, 151*b* are supplied as inputs to driver 151*c* to turn this network ON or OFF, in dependence upon which of the gates is operated. Driver 151*c*** may be a bistable multivibrator whose output is utilized to operate the lamps or relays or other devices which provide the indication or control for the functions.

The ON and OFF gates for each function circuit receive one common input from the decoding matrix output terminal which is associated with the function. Thus, gates **151*a*, 151*b* receive a common input from matrix output terminal 141; gates 153*a*, 153*b* receive a common input from matrix output terminal 143, etc. Each of the ON gates 151*a* through 158*a* receives a common input through a conductor 160 from the output of multivibrator 132, while each of the OFF gates 151*b* through 158*b* receives a common input through a conductor 161 from the output of the OFF multivibrator 133**.

The operation of the decoder can best be explained by first assuming that all of the function switches at the coder are open even though in actual practice the decoder would not be utilized unless the station alarm detector indicated a malfunction. Under these conditions, the pulse train received from switch 50 is uniform and comprises a pulse train as shown in graph **5*m*. This positive going output pulse train drives binary devices 121, 122 and 123** to produce output pulse trains A, B, C, D, E and F from these devices as shown in FIGURES 5*c* through 5*h*. These binary output pulses are supplied to the corresponding inputs of decoding matrix 135 where they are operative to produce an output signal on each of the matrix output terminals 141 through 148 during the period of the clock cycle corresponding to the associated function, in accordance with the binary code shown in Table 1.

The positive going output signal from switch 50 also triggers the first delay 126, closes gate 125, closes gate 130 and provides a pulse to reset multivibrators 132 and 133 at the start of the pulse. Simultaneously with the above action, the negative going signal from inverter 120 opens gate 131. When delay 126 recovers (or goes from negative to positive), which recovery will occur in approximately the middle of the first period, this positive signal passes through gate 131 to trigger multivibrator 133. Triggering of mulivibrator 133 sends a pulse over conductor 161 and through OFF gate to **151*b* to flip driver 151*c* to OFF to thus deenergize the lamp or relay connected to the output of this driver. It will be recalled that during the first clock period, matrix 135 produces an output signal on terminal 141, and only on terminal 141 to open gates 151*a*, 151*b*. It will be noted that the output from multivibrator 133 on conductor 161 is also supplied to the seven other OFF gates associated with the drivers 152*c* through 158*c* but since none of these seven other OFF gates receive input pulses from their associated output terminals of decoding matrix 135** during the first clock period, these gates are not opened.

During the above action, multivibrator 132 is not triggered since its associated gate 161 was held closed by the long positive pulse from switch 50 until after delay 126 has recovered.

With all functions normal, the operation continues as above through each of the eight periods of the clock cycle to put each of the eight drivers in the OFF condition and prevent energization of any of the associated lamps or relays. As discussed above, after the eighth pulse has come through, there is a time longer than two-thirds of a clock period when no pulse is being received. When this occurs, gate 125 is held open by the lack of a positive going pulse from switch 50 for a time sufficient for the positive going pulse from delay 127 to pass through gate 125 and reset the binary devices 121, 122 and 123.

This resetting automatically synchronizes the coder with the decoder after any interruption in the communication link between the two elements. In this connection, it will be noted that the zero time is accurately derived on the basis of the timing of the code pulse train, since delay 126 is triggered by the incoming pulse train and delay 127 is triggered by delay 126. Thus, the pulse from delay 127 extends into the following clock period in order to derive the zero time, but this pulse is based on the timing of the pulse train itself since it is based on the triggering of delay 126 by the pulse train.

Next, assume that the function switch 17 in coder 10 is closed and that indicator 106 of alarm detector 44 is energized so that the operator will wish to decode the signal train from coder 10 to pinpoint the malfunction. Under these conditions, there is a short pulse during the third clock period, rather than a long pulse which occurs during this period when the switch is open. This short pulse is shaped in shaper 89 and supplied through terminal 90 and selector switch 50 to the decoder. The received positive going pulse as shown by the dotted line portion of graph *5m* is now shorter than the negative going pulse from delay 126 during the third period, so that the end of the negative going pulse from delay 126 now passes through gate 130 to trigger multivibrator 132. At the same time, gate 131 is closed, owing to the short negative pulse out of pulse shaper 89, so that multivibrator 133 is not triggered.

Triggering of multivibrator 132 sends a pulse over conductor 160 to the inputs of the eight ON gates *151a* through *158a*. However, since only gate *153c* is receiving an input from its associated output terminal 143 of matrix 135 during the third period, the pulse on conductor 160 passes only through gate *153a* to driver *153c*. This turns this driver ON to supply energization to its associated lamp or relay to indicate that function switch 17 is closed. It will be seen that driver *153c* will remain ON until a long pulse comes through during the third clock period, so that the system will continue to indicate that this function switch is closed until it is actually opened. The output of the driver together with the selector switch position will therefore pinpoint the station and function which operates abnormally.

As has been explained, when switch 50 is turned to a new station synchronization of the display with the new pulse train commences with the zero period. Prior to the time of arrival of the new zero pulse, the display will indicate the portion of the display received by the old station after reception of the old zero period and before switching to the new station. When the pulse train from the new station is received, the decoder has no way of knowing that there has been a change and will continue to trigger devices 121, 122 and 123. Consequently the resulting display makes very little sense, until a new zero period is received.

In some applications, this brief interval of nonintelligent information display has been found objectionable and a station switching synchronizer is provided which wipes out the old display after the new zero period has been received and synchronization with the new pulse train has been established. Switching synchronization is provided through a bistable multivibrator 170 triggered by a pulse from switch 50. This triggering pulse may be provided by gang connecting a further contact plate to switch 50 in a way well understood by those skilled in the art.

The high output terminal of multivibrator 170 is connected to the reset line of devices 121, 122 and 123 through a conventional OR circuit 171. Accordingly, whenever multivibrator 170 is set or when a zero period is received, a pulse is provided to reset devices 121, 122 and 123. Therefore, upon switching to a new station, the binary devices are reset. Also, the reset terminal of multivibrator 170 is connected to AND gate 125 so that multivibrator 170 is reset whenever a zero period is received. To prevent the pulses of the new pulse train from actuating multivibrators 133 or 132, the inputs to AND gates 130 and 131 are clamped so that no output signals are provided to set multivibrators 132 and 133. For this purpose a clamp 172 is connected in the circuit between delay 126 and AND gates 130 and 131. Clamp 172 is actuated by the output pulse of multivibrator 170 and remains on until multivibrator 170 is reset. In this manner no displays are recorded until synchronization has taken place.

In the above described embodiment, it was assumed that the functions being monitored were represented by the opening and closing of a switch, but it will be apparent to those skilled in the art that any other binary representation of a function may be utilized in the present invention with equal facility. Similarly, it was assumed that lamps or relays were energized at the decoder end of the system in response to the detection of an abnormal condition of one of the functions, but it will be clear that any other suitable type of device may be utilized in this connection, or that some control operation may be initiated in response to this detection to return the condition of the function to normal. Also, although the invention was described in connection with eight functions, it will be apparent that it is equally applicable to an increased number of functions by an increase in the number of binary stages and an expansion of the matrices to suit the desired number of functions.

Although but a few embodiments have been illustrated or described, it will be apparent that various changes and modifications may be made therein without departing from the spirit of the invention or the scope of the appended claims.

What is claimed is:

1. An encoding station for providing a pulse train having sequentially and cyclically encoded thereon a plurality of condition responsive functions each of which has a first and a second condition, and each of which is associated with a different period within one cycle of said pulse train, said encoding station comprising:

a source of periodic pulses for providing a timing cycle consisting of one function pulse associated with each function;

modulation means responsive to said periodic pulses and the condition of said functions and operative to sequentially modulate each of said function pulses in accordance with the condition of the associated function and to provide a cycle signal after completing a sequence of modulation;

means responsive to said cycle signal and operative to disable said source of periodic pulses for a first time interval to provide a cycle pulse indicative of the end of a cycle; and means responsive to the condition of said functions and operative to disable said source of periodic pulses for a second time interval when a function changes its condition to provide a change of condition pulse indicative of a change of condition of a function.

2. An encoding station for providing a pulse train having sequentially and cyclically encoded thereon a plurality of condition responsive functions each of which has a first and a second condition and each of which is associated with a defferent period within one cycle of said pulse train, said encoding station comprising:

a source of periodic pulses providing a timing cycle consisting of one function pulse associated with each of said functions;

function interrogating means responsive to said periodic pulses and operative to sequentially interrogate each of said functions and to derive a function condition signal indicative of the condition of the interrogated function;

output means responsive to said periodic pulses and said function condition signals and operative to provide a train of coded function pulses, each coded function pulse having one characteristic for one condition of the function condition signal and another characteristic for the other condition of the function condition signal;

pulse train cycle means responsive to said interrogating means and operative to disable said source of periodic pulses for a first time interval to provide a cycle pulse indicative of the end of a cycle; and function condition means responsive to the condition of each of said plurality of functions and operative to disable said source of period pulses for a second time interval, different in duration from said first time interval, to provide a change of condition pulse indicative of a change of condition of a function.

3. An encoding station for providing a pulse train having sequentially and cyclically encoded thereon a plurality of condition responsive functions each of which has a first and a second condition and each of which is associated with a different period within one cycle of said pulse train, said encoding station comprising:

a source of periodic pulses providing a timing cycle consisting of one function pulse associated with each function;

function interrogating means responsive to said periodic pulses and operative to sequentially interrogate said functions and to derive a function condition signal indicative of the condition of the interrogated function;

output means responsive to said periodic pulses and said function condition signals and operative to provide a train of coded function pulses, each coded function pulse having one characteristic for one condition of the function condition signal and another characteristic for the other condition of the function condition signal;

pulse train cycle means responsive to said interrogating means and operative to develop a cycle signal at the end of a complete sequence of interrogation of said functions;

function condition means responsive to the condition of each of said functions and operative to develop a change of condition signal whenever a function changes its condition;

first disabling means responsive to said cycle signal and operative to disable said source of periodic pulses for a first time interval to provide a cycle pulse indicative of the end of a cycle; and second disabling means responsive to said change of condition signal and operative to disable said source of periodic pulses for a second time interval, different in duration from said first time interval, to provide a change of condition pulse indicative of a change of condition of a function.

4. An alarm detector for use with a pulse train of periodic function pulses having sequentially and cyclically encoded thereon a plurality of condition responsive functions each of which has a first and a second condition, and each of which is associated with a different function pulse within one cycle of said pulse train, and in which the successive cycles of said pulse train are separated by a cycle pulse, and in which a change of condition of any function to a selected condition is encoded upon said pulse train by a change of condition pulse, and for providing a first indication when a function changes to the selected condition and a second indication when any function has the selected condition, said alarm detector comprising:

first means responsive to said pulse train and operative to provide an alarm signal in response to the occurrence of a change of condition pulse;

first indicator means responsive to said alarm signal and operative to provide said first indication;

second means responsive to said pulse train and operative to provide a cycle signal in response to the occurrence of a cycle pulse, said second means also being operative to analyze the condition of the function pulse and to provide a condition signal in response to the occurrence of a function pulse indicative of a function having the selected condition; and second indicator means responsive to said alarm signal and said condition signal and operative to be turned "on" by said alarm signal and said condition signal, and be turned "off" only by and upon the occurrence of two successive cycle signals in the absence of the occurrence of an intervening condition signal.

5. An alarm detector in accordance with claim 4 in which said first means is an integrator and in which said condition pulse is of longer duration than said cycle pulse.

6. An alarm detector for use with a pulse train of periodic function pulses having sequentially and cyclically encoded thereon a plurality of condition responsive functions each of which has a first and a second condition, and each of which is associated with a different function pulse within one cycle of said pulse train, and in which the successive cycles of said pulse train are separated by a cycle pulse, and in which a change of condition of any function to said first condition is encoded upon said pulse train by a condition pulse, and for providing a first indication when a function changes in the first condition and a second indication when any function has a first condition, said alarm detector comprising:

first means responsive to said pulse train and operative to provide an alarm signal in response to the occurrence of a condition pulse;

first indicator means responsive to said alarm signal and operative to provide said first indication;

second means responsive to said pulse train and operative to provide a cycle signal in response to the occurrence of a cycle pulse, said second means also being operative to analyze the condition of the function pulse and to provide a condition signal in response to the occurrence of a function pulse indicative of a function having said first condition;

first bistable means responsive to said alarm signal and said condition signal and operative to be "set" upon the occurrence of said alarm signal and said condition signal, said first bistable means being also responsive to said cycle signal and operative to be "reset" upon the occurrence of said cycle signal;

gating means responsive to the state of said first bistable means for gating said cycle signal and for providing a gated cycle signal;

second bistable means responsive to said alarm signal and said condition signal and operative to be "set" upon the occurrence of said alarm signal and said condition signal, said second bistable means also being responsive to said gated cycle signal and operative to be "reset" upon the occurrence of said gated cycle signal; and second indicator means responsive to the state of said second bistable means and operative to provide said second indication.

7. A decoding station for selectively decoding one of a plurality of pulse trains each of which includes periodic function pulses having sequentially and cyclically encoded thereon a plurality of condition responsive functions each of which has a first and a second condition, and each of which is associated with a different function pulse within one cycle of said pulse train, and in which the successive cycles of said pulse train are separated by a cycle pulse, said decoding station comprising:

receiver means for each pulse train;

pulse train analyzing means responsive to the received pulse train and operative to provide a cycle signal in response to the occurrence of a cycle pulse, a first condition signal in response to the occurrence of a function pulse indicative of a function having said first condition, and a second condition signal in response to the occurrence of a function pulse indicative of a function having said second condition;

switching means for selectively connecting one of said receiver means to said analyzing means, said switching means providing a switching signal whenever a new selection is made; and position and indicating means responsive to said condition signals and said cycle signal and operative to detect the position of each function pulse and to provide an indication of the condition of each function, said position and indicating means also being responsive to said switching signal and operative to return to its starting position upon the occurrence of said switching signal and to prevent the indication of any function until the occurrence of a cycle signal after the occurrence of said switching signal.

8. A decoding station for selectively decoding a plurality of pulse trains, each of which includes periodic function pulses having sequentially and cyclically encoded thereon a plurality of condition responsive functions each of which has a first and a second condition, and each of which is associated with a different function pulse within one cycle of said pulse train, and in which the successive cycles of said pulse train are separated by a cycle pulse, said decoding station comprising:

a receiver means for each pulse train;

pulse train analyzing means responsive to the received pulse train and operative to provide a cycle signal in response to the occurrence of a cycle pulse, a first condition signal in response to the occurrence of function pulse indicative of a function having said first condition, and a second condition signal in response to the occurrence of a function pulse indicative of a function having said second condition;

switching means for selectively connecting one of said receiver means to said analyzing means, said switching means providing a switching signal whenever a new selection is made;

a sequentially advanceable position means responsive to said function pulses and operative to be advanced in position by one step upon the occurrence of each successive function pulse and to provide a position signal indicative of its position, said position means also being responsive to said switching signal and said cycle signal and operative to be "reset" to a starting position upon the occurrence of said switching signal and said cycle signal;

means responsive to said switching signal and said cycle signal to "off" gate said condition signals during the interval between the occurrence of said switching signal and a cycle signal; and circuit means including a plurality of indicator means each associated with a different function, said circuit means being responsive to said position signal and said first and second condition signal and operative to "set" each indicator means to reflect the condition of the associated function.

9. A system for monitoring a plurality of stations each having associated therewith a plurality of condition responsive functions which have a first and a second condition, said system comprising:

encoding means for providing a pulse train at each station including, a source of periodic pulses for providing a timing cycle consisting of one function pulse associated with each function, modulation means responsive to said periodic pulses and the condition of said functions and operative to sequentially modulate each of said function pulses in accordance with the condition of the associated function and to provide a cycle signal after completing a sequence of modulation, means responsive to said cycle signal and operative to disable said source of periodic pulses for a first time interval to provide a cycle pulse indicative of the end of a cycle, and condition change means responsive to the condition of said functions and operative to disable said source of periodic pulses for a second time interval, differing in duration from said first interval, to provide a change of condition pulse indicative of a change of condition of a function to a selected condition; and alarm detector means associated with each encoding means and responsive to the pulse train and operative to provide a first indication upon the occurrence of said change of condition pulse and a second indication upon the occurrence of a function pulse indicative of a function having said selected condition, said second indication being reset by the occurrence of two successive cycle pulses in the absence of the occurrence of an intervening function pulse indicative of a function having said selected condition.

10. A system for monitoring a plurality of stations each having associated therewith a plurality of condition responsive functions which have a first and second condition, said system comprising:

encoding means for providing a pulse train at each station including, a source of periodic pulses for providing a timing cycle consisting of one function pulse associated with each function, modulation means responsive to said periodic pulses and the condition of said functions and operative to sequentially modulate each of said function pulses in accordance with the condition of the associated function and to provide a cycle signal after completing a sequence of modulation, means responsive to said cycle signal and operative to disable said source of periodic pulses for a first time interval to provide a cycle pulse indicative of the end of a cycle, and condition change means responsive to the condition of said functions and operative to disable said source of periodic pulses for a second time interval, differing in duration from said first interval, to provide a change of condition pulse indicative of a change of condition of a function to a selected condition;

alarm detector means associated with each encoding means and responsive to the pulse train and operative to provide a first indication upon the occurrence of said change of condition pulse and a second indication upon the occurrence of a function pulse indicative of a function having said selected condition, said second indication being reset by the occurrence of two successive cycle pulses in the absence of the occurrence of an intervening function pulse indicative of a function having said selected condition; and decoding means, including switch means for selecting one of said encoding stations and for decoding the pulse train from a selected encoding station, said decoding means being responsive to the selected pulse train and operative to detect the position and condition of each function pulse in the pulse train, said decoding means utilizing said cycle pulse for timing to detect the position of each of said function pulses and the modulation of each function pulse to detect the condition of the associated function.

11. A system for monitoring a plurality of stations each having associated therewith a plurality of condition responsive functions which have a first and a second condition, said system comprising:

encoding means for providing a pulse train at each station including, a source of periodic pulses for providing a timing cycle consisting of one function pulse associated with each function, modulation means responsive to said periodic pulses and the condition of said functions and operative to sequentially modulate each of said function pulses in accordance with the condition of the associated function and to provide a cycle signal after completing a sequence of modulation, means responsive to said cycle signal and operative to disable said source of periodic pulses for a first time interval to provide a cycle pulse indicative of the end of a cycle, and condition change means responsive to the condition of said functions and operative to disable said source of periodic pulses for a second time interval, differing in duration from said first interval, when a function changes its condition to provide a change of condition pulse indicative of a change of a function to a selected condition;

transmission means coupled to each encoding means for transmitting its pulse train;

alarm detector means coupled to each transmission means and including, first detector means responsive to said pulse train and operative to provide an alarm signal in response to the occurrence of a change of condition pulse, first indicator means responsive to said alarm signal and operative to provide an indication of a change of condition of a function to the selected condition, second detector means responsive to said pulse train and operative to provide a detected cycle signal in response to the occurrence of a cycle pulse and a selected condition signal in response to the occurrence of a function pulse indicative of a function having said selected condition, second indicator means responsive to said alarm signal, said detected cycle signal and said selected condition signal and operative to be turned "on" by said alarm signal and said selected condition signal, and be turned "off" only by and upon the occurrence of two successive detected cycle signals in the absence of the occurrence of an intervening selected condition signal; and decoding means including switch means for connecting said decoding means to a selected one of said transmission means, said decoding means being responsive to the pulse train from the selected station and operative to detect the position and condition of each function pulse in the pulse train, said decoding means utilizing said cycle pulse for timing to detect the position of each of said function pulses and the modulation of each function pulse to detect the condition of the associated function.

12. A system for monitoring a plurality of stations each having associated therewith a plurality of condition responsive functions which have a first and a second condition, said system comprising:

encoding means for providing a pulse train at each station including, a source of periodic pulses for providing a timing cycle consisting of one function pulse assoicated with each function, modulation means responsive to said periodic pulses and the condition of said functions and operative to sequentially modulate each of said function pulses in accordance with the condition of the associated function and to provide a cycle signal after completing a sequence of modulation, means responsive to said cycle signal and operative to disable said source of periodic pulses for a first time interval to provide a cycle pulse indicative of the end of a cycle, and condition change means responsive to the condition of said functions and operative to disable said source of periodic pulses for a second time interval, differing in duration from said first interval, to provide a change of condition pulse indicative of a change of condition of a function to a selected condition;

a transmission means coupled to each encoding means for transmitting its pulse train;

alarm detector means coupled to each transmission means and including, first detector means responsive to the transmitted pulse train and operative to provide an alarm signal in response to the occurrence of a change of condition pulse, first indicator means responsive to said alarm signal and operative to provide an indication of a change of condition of a function to the selected condition, second detector means responsive to said pulse train and operative to provide a detected cycle signal in response to the occurrence of a cycle pulse and a selected condition signal in response to the occurrence of a function pulse indicative of a function having a selected condition, second indicator means responsive to said alarm signal, detected cycle signal and said selected condition signal and operative to be turned "on" by said alarm signal and said selected condition signal, and be turned "off" only by and upon the occurrence of two successive detected cycle signals in the absence of the occurrence of an intervening selected condition signal; and decoding means including, pulse train analyzing means responsive to the transmitted pulse train and operative to provide a decoded cycle signal in response to the occurrence of a cycle pulse, a first condition signal in response to the occurrence of function pulse indicative of a function having said first condition, and a second condition signal in response to the occurrence of a function pulse indicative of a function having said second condition, switching means for selectively connecting one of said transmission means to said analyzing means, said switching means providing a switching signal whenever a new selection is made, a sequentially advanceable position means responsive to the function pulses of the selected pulse train and operative to be advanced in position by one step upon the occurrence of each successive function pulse and to provide a position signal indicative of its position, said position means also being responsive to said switching signal and said decoded cycle signal and operative to be "reset" to its starting position upon the occurrence of said switching signal and said decoded cycle signal, inhibiting means responsive to said switching signal and said decoded cycle signal to "off" gate said condition signals during the interval between the occurrence of a switching signal and the subsequent occurrence of a decoded cycle signal, and circuit means having a plurality of indicator means each associated with a different function, said circuit means being responsive to said position signal and said first and second condition signal and operative to "set" each indicator means to reflect the condition of the associated function.

No references cited.

NEIL C. READ, *Primary Examiner.*

P. XIARHOS, A. KASPER, *Assistant Examiners.*

UNITED STATES PATENT OFFICE
CERTIFICATE OF CORRECTION

Patent No. 3,293,605 December 20, 1966

Laurence Moore

It is hereby certified that error appears in the above numbered patent requiring correction and that the said Letters Patent should read as corrected below.

In the heading to the printed specification, lines 3 and 4, for "Laurence Moore, 1280 Lincoln Ave., Palo Alto, Calif. 94301" read -- Laurence Moore, Palo Alto, Calif. assignor to Moore Associates, Inc., Redwood City, Calif., a corporation of California --.

Signed and sealed this 12th day of September 1967.

(SEAL)
Attest:

ERNEST W. SWIDER
Attesting Officer

EDWARD J. BRENNER
Commissioner of Patents